(12) United States Patent (10) Patent No.: US 12,629,979 B2
Cho (45) Date of Patent: *May 19, 2026

(54) STRUCTURE AND MOVABLE OBJECT INCLUDING THE SAME

(71) Applicants:Hyundai Motor Company, Seoul (KR); Kia Corporation, Seoul (KR)

(72) Inventor: Yong Jin Cho, Hwaseong-si (KR)

(73) Assignees: 1. Hyundai Motor Company;, Seoul (KR); 2. Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/827,402

(22) Filed: Sep. 6, 2024

(65) Prior Publication Data

US 2025/0242654 A1 Jul. 31, 2025

(30) Foreign Application Priority Data

Jan. 29, 2024 (KR) ........................ 10-2024-0013325

(51) Int. Cl.
B60G 21/055 (2006.01)

(52) U.S. Cl.
CPC ...... B60G 21/0556 (2013.01); B60G 2204/10 (2013.01)

(58) Field of Classification Search
CPC .... B60K 1/00; B60G 21/055; B60G 21/0551; B60G 11/183; B60G 2202/135; B60G 2204/15
USPC .................................................. 280/124.106
See application file for complete search history.

(56) References Cited

U.S. PATENT DOCUMENTS

| | | | | | |
|---|---|---|---|---|---|
| 2,554,784 | A | * | 5/1951 | Leighton | .............. B60G 21/055 |
| | | | | | 403/162 |
| 5,178,406 | A | * | 1/1993 | Reynolds | ........... B60G 21/0551 |
| | | | | | 280/5.511 |
| 2020/0262483 | A1* | | 8/2020 | Murai | ...................... B60K 1/00 |
| 2021/0291613 | A1* | | 9/2021 | Nagayama | ......... B60G 21/0551 |
| 2023/0066515 | A1 | | 3/2023 | Kim | |

FOREIGN PATENT DOCUMENTS

| | | | |
|---|---|---|---|
| CN | 209634202 | U | 11/2019 |
| CN | 210011800 | U | 2/2020 |
| CN | 112665868 | A | 4/2021 |
| EP | 1690779 | A | 8/2006 |
| JP | 2014-128991 | A | 7/2014 |
| KR | 10-2006-0062513 | A | 6/2006 |
| KR | 10-2022-0006391 | A | 1/2022 |
| KR | 10-2023-0030240 | A | 3/2023 |

OTHER PUBLICATIONS

Joo KR20060062513 English Translation (Year: 2006).*

* cited by examiner

*Primary Examiner* — Paul N Dickson
*Assistant Examiner* — Caitlin Anne Miller
(74) *Attorney, Agent, or Firm* — MORGAN, LEWIS & BOCKIUS LLP

(57) ABSTRACT

A structure includes a suspension module including a suspension frame, and a stabilizer bar provided to face one side of the suspension frame, in which the stabilizer bar includes a first side stabilizer bar provided to face a first side region of the suspension frame, and a second side stabilizer bar provided to face a second side region of the suspension frame, and in which the first side stabilizer bar and the second side stabilizer bar are provided to be attachable to or detachable from each other.

18 Claims, 7 Drawing Sheets

210

212

STRUCTURE AND MOVABLE OBJECT INCLUDING THE SAME

CROSS-REFERENCE TO RELATED APPLICATION

The present application claims priority to Korean Patent Application No. 10-2024-0013325 filed on Jan. 29, 2024, the entire contents of which is incorporated herein for all purposes by this reference.

BACKGROUND OF THE PRESENT DISCLOSURE

Field of the Present Disclosure

The present disclosure relates to a structure and a movable object including the same, and more particularly, to a structure, which includes a suspension system, and a movable object including the same.

Description of Related art

In case that designs of vehicles are changed from vehicles in the related arts, which use internal combustion engines as power sources, to electric vehicles that use batteries as power sources, mounting positions of suspension systems, which are mounted in the vehicles, and surrounding components thereof need to be changed. However, it is necessary to maximize the utilization of an internal space of the vehicle to mount a PE module, which includes a battery, a motor configured to operate a wheel by receiving electrical energy from the battery, a speed reducer, an inverter, and the like, in a limited space in the vehicle.

For example, generally, a stabilizer bar and a gearbox are provided in a suspension system of a vehicle. However, a space, in which the stabilizer bar is mounted, and a space, in which the gearbox is mounted, are separated from each other, which degrades the utilization of the internal space of the vehicle. Therefore, it is necessary to design the electric vehicle, in which a high-capacity battery and a PE module are mounted, in consideration of a space occupied by the battery.

Furthermore, generally, because of the volumes occupied by the battery and the PE module in the electric vehicle equipped with the high-capacity battery and the PE module, components in the vehicle, which do not need to be subjected to replacement or maintenance, are inevitably detached when components, which need to be replaced or maintained, are detached. For the present reason, there is a problem in that the maintainability deteriorates.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to maximizing utilization of an internal space of a vehicle.

The present disclosure has also been made in an effort to detach only components that need to be replaced or maintained, improving maintainability of the vehicle.

To achieve the above-mentioned objects, one aspect of the present disclosure provides a structure including: a suspension module including a suspension frame; and a stabilizer bar provided to face one side of the suspension frame, in which the stabilizer bar includes: a first side stabilizer bar provided to face a first side region of the suspension frame; and a second side stabilizer bar provided to face a second side region of the suspension frame, and in which the first side stabilizer bar and the second side stabilizer bar are provided to be attachable to or detachable from each other.

The structure may further include: a fixing portion including one side fixedly coupled to the suspension frame and configured to fix the stabilizer bar relative to the suspension frame; and a power electronics (PE) module fixedly coupled to one side of the fixing portion.

The fixing portion may further include: a PE module fixing member including one side fixedly coupled to the suspension frame and configured to define a region to which the PE module is fixed; and a stabilizer bar fixing member including one side fixedly coupled to the suspension frame and configured to define a region penetrated by the stabilizer bar, and in which the PE module fixing member and the stabilizer bar fixing member are spaced apart from each other in a direction in which the suspension frame extends.

The stabilizer bar fixing member may include: a first side stabilizer bar fixing member fixed relative to the suspension frame and penetrated by the first side stabilizer bar; and a second side stabilizer bar fixing member fixed relative to the suspension frame and penetrated by the second side stabilizer bar.

The stabilizer bar fixing member may be tightly attached to the stabilizer bar in a region in which the stabilizer bar is provided to penetrate the stabilizer bar fixing member.

The fixing portion may include: a PE module fixing member including one side fixedly coupled to the suspension frame and configured to define a region to which the PE module is fixed; and a stabilizer bar fixing member configured to define a region penetrated by the stabilizer bar, and the stabilizer bar fixing member may be press-fitted into the PE module fixing member.

A region of the stabilizer bar fixing member, which is penetrated by the stabilizer bar, may include a through-hole shape surrounded by a closed curve.

The stabilizer bar fixing member may be fixed relative to the suspension frame as the PE module fixing member and the suspension frame are fixedly coupled.

The stabilizer bar fixing member may be tightly attached to the suspension frame.

The structure may further include: a bolt member configured to penetrate the first side stabilizer bar and the second side stabilizer bar in a region in which the first side stabilizer bar and the second side stabilizer bar overlap together; and a nut member coupled to the bolt member.

The first side stabilizer bar may be provided to face the suspension frame with the second side stabilizer bar interposed therebetween in a region in which the bolt member is provided to penetrate the first side stabilizer bar and the second side stabilizer bar.

In a region in which the first side stabilizer bar and the second side stabilizer bar overlap together, a first concave-convex region may be formed on the first side stabilizer bar and include a section protruding toward the second side stabilizer bar, and a section recessed in a direction away from the second side stabilizer bar, a second concave-convex region including a shape corresponding to the first concave-convex region may be formed on the second side stabilizer bar, and the first concave-convex region and the second concave-convex region may be coupled while engaging with each other.

No configuration may be provided to relatively fix the first concave-convex region and the second concave-convex region.

A relative movement between the first concave-convex region and the second concave-convex region, in a region in which the first concave-convex region and the second concave-convex region engage with each other, may be restricted only by interference between the first concave-convex region and the second concave-convex region and a frictional force between the first concave-convex region and the second concave-convex region.

The first concave-convex region may include a section protruding in a cross shape, and the second concave-convex region may include a section recessed in a cross shape and including a shape corresponding to the cross shape of the first concave-convex region.

A direction in which the first side stabilizer bar is provided to penetrate the first side stabilizer bar fixing member may be parallel to a direction in which the first side stabilizer bar faces the first concave-convex region.

A region of the first side stabilizer bar, which extends from the first side stabilizer bar fixing member to the first concave-convex region, may include a straight shape.

The first side stabilizer bar or the second side stabilizer bar may penetrate the PE module fixing member.

The first side stabilizer bar or the second side stabilizer bar may be substantially spaced apart from the PE module fixing member in a region in which the first side stabilizer bar or the second side stabilizer bar is provided to penetrate the PE module fixing member.

To achieve the above-mentioned objects, another aspect of the present disclosure provides a vehicle including the structure, in which one side of the structure is connected to a front wheel of the vehicle.

According to an exemplary embodiment of the present disclosure, it is possible to maximize the utilization of the internal space of the vehicle.

Furthermore, according to an exemplary embodiment of the present disclosure, it is possible to detach only the component that needs to be replaced or maintained, improving the maintainability of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
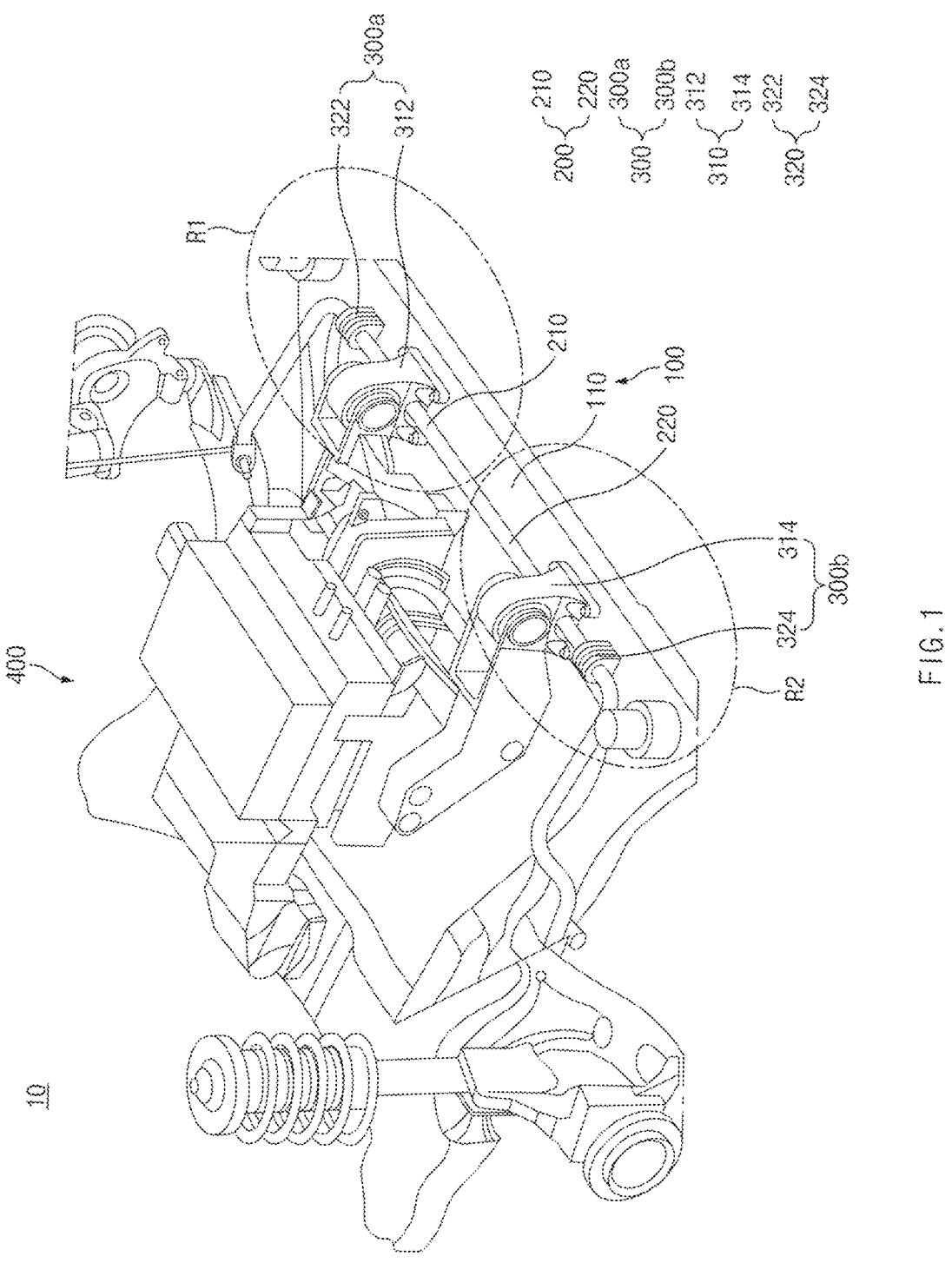
FIG. 1 is a perspective view exemplarily illustrating a structure according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a structure and a vehicle including the same according to an exemplary embodiment of the present disclosure will be described with reference to the drawings. The vehicle included in the present specification may be based on the concept including electric vehicles, PBVs, and the like that operate by use of electricity as power sources.

Structure

Figure 2:
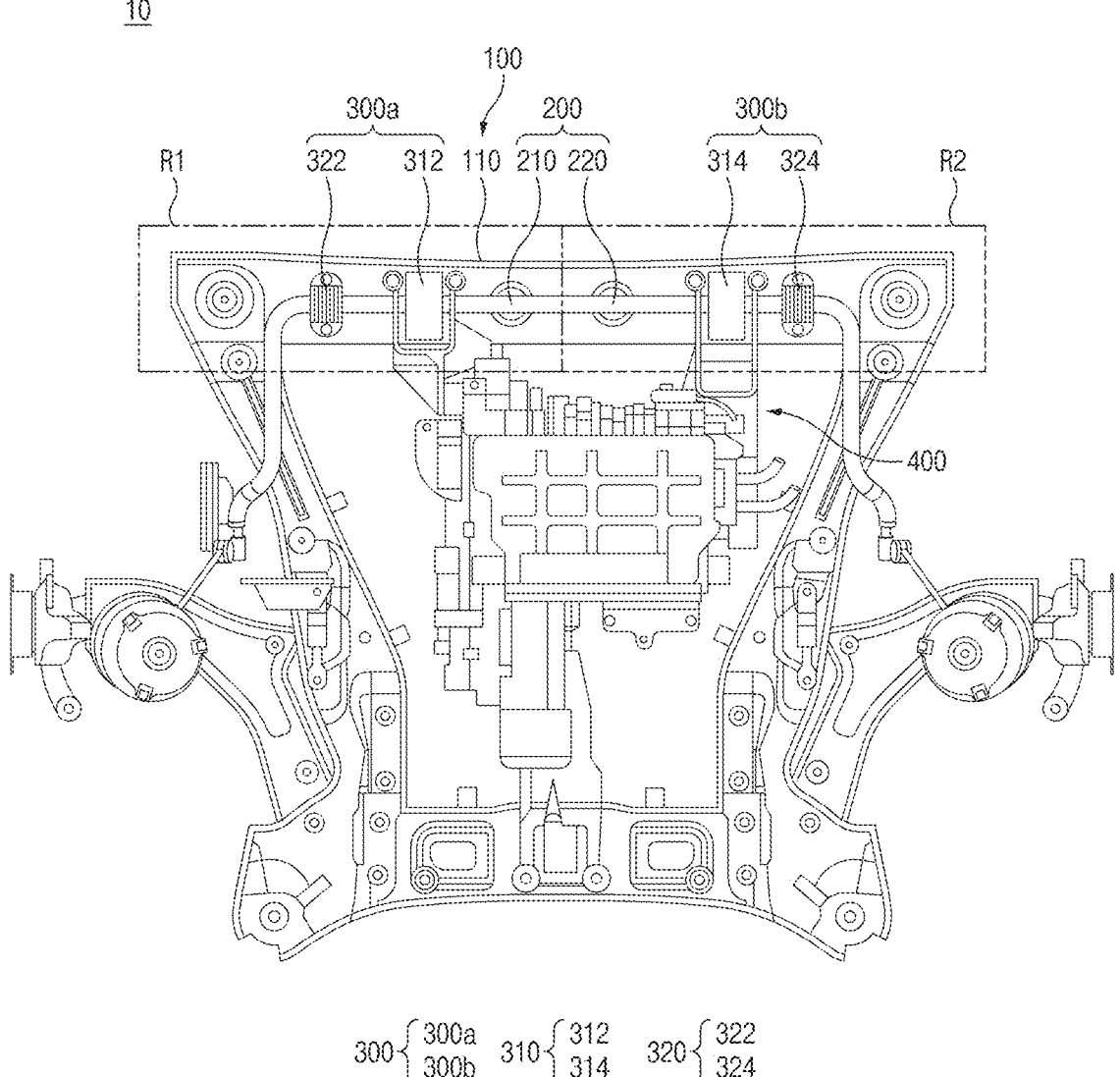
FIG. 2 is a perspective view exemplarily illustrating the structure according to the exemplary embodiment of the present disclosure.
Figure 3:
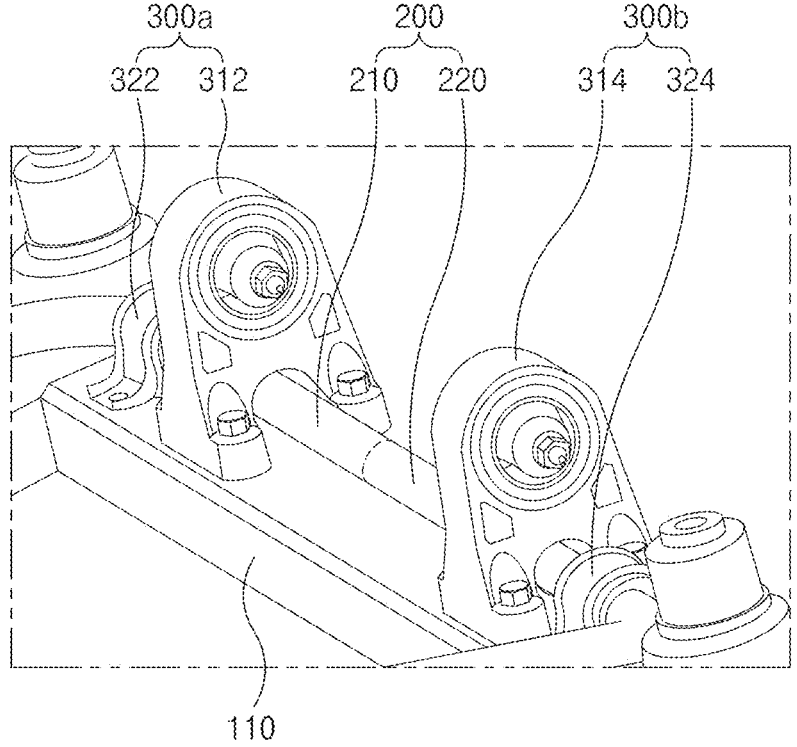
FIG. 3 is an enlarged view exemplarily illustrating a PE module fixing member, a stabilizer bar fixing member, and surrounding components thereof illustrated in FIG. 1.
Figure 4:
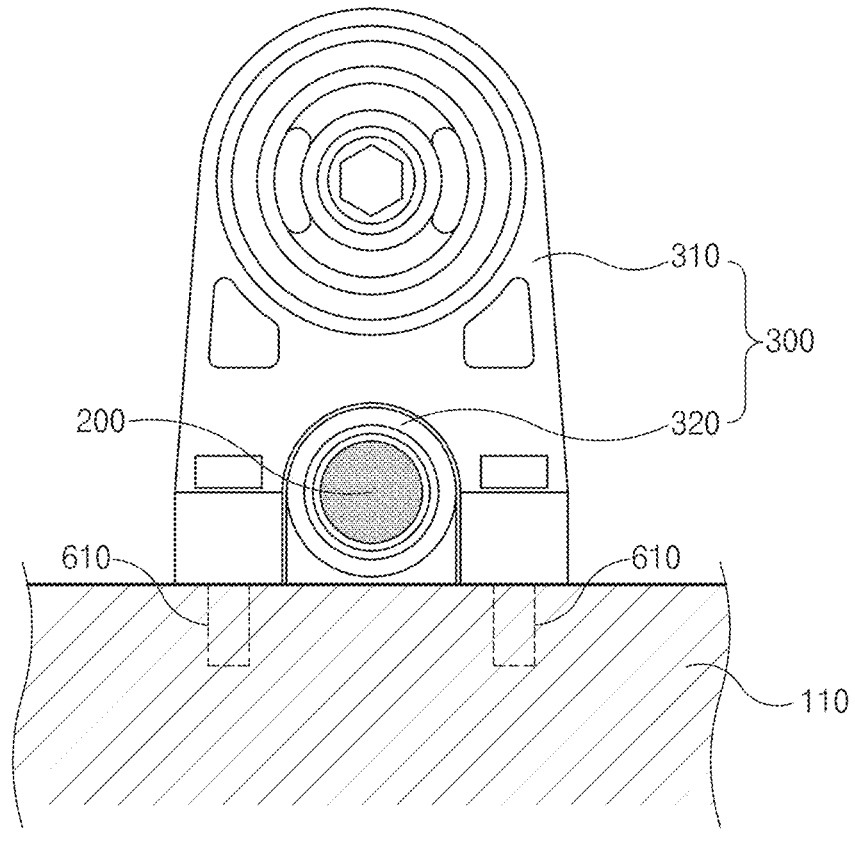
FIG. 4 is a view exemplarily illustrating a PE module fixing member and a stabilizer bar fixing member of a fixing portion applied to a structure according to another exemplary embodiment of the present disclosure.

FIG. 1 is a perspective view exemplarily illustrating a structure according to an exemplary embodiment of the present disclosure, and FIG. 2 is a perspective view exemplarily illustrating the structure according to the exemplary embodiment of the present disclosure. FIG. 3 is an enlarged view exemplarily illustrating a power electronics (PE) module fixing member, a stabilizer bar fixing member, and surrounding components thereof illustrated in FIG. 1, and FIG. 4 is a view exemplarily illustrating a PE module fixing member and a stabilizer bar fixing member of a fixing portion applied to a structure according to another exemplary embodiment of the present disclosure.

With reference to FIG. 1, FIG. 2, FIG. 3, and FIG. 4, a structure 10 according to an exemplary embodiment of the present disclosure may include a suspension module 100 provided in a suspension system. The suspension module 100 may include a suspension frame 110 configured to define a body of the suspension module 100. As described below, the suspension frame 110 is configured to fix and support a PE module as well as a stabilizer bar provided in the suspension system.

The structure 10 according to an exemplary embodiment of the present disclosure may further include a stabilizer bar 200 provided to face one side of the suspension frame 110.

For example, the stabilizer bar 200 may be provided to face an upper surface of the suspension frame 110.

The structure 10 according to an exemplary embodiment of the present disclosure may further include a configuration that maintains a state in which the stabilizer bar 200 faces one side of the suspension frame 110. The structure 10 may further include a fixing portion 300 including one side fixedly coupled to the suspension frame 110 and configured to fix the stabilizer bar 200 relative to the suspension frame 110. In the instant case, the configuration in which the stabilizer bar 200 is fixed relative to the fixing portion 300 may be interpreted as including a case in which the state in which the stabilizer bar 200 faces one side of the suspension frame 110 is maintained even when the stabilizer bar 200 and the fixing portion 300 are somewhat swayed by an external force, vibration, or the like.

Meanwhile, according to an exemplary embodiment of the present disclosure, the structure 10 may further include a PE module (power electronics module) 400 fixedly coupled to one side of the fixing portion 300. The PE module may be configured to operate the vehicle with electrical energy and include components such as a motor, a speed reducer, and an inverter. The description of detailed configurations of the PE module will be replaced with the contents included in the related art.

Meanwhile, as illustrated in FIG. 1, FIG. 2, and FIG. 3, according to an exemplary embodiment of the present disclosure, the stabilizer bar 200 may penetrate the fixing portion 300. In the instant case, a spacing distance between the suspension frame 110 and a region in which the PE module 400 is fixed to the fixing portion 300 may be longer than a spacing distance between the suspension frame 110 and a region in which the stabilizer bar 200 is provided to penetrate the fixing portion 300. It may be understood that the PE module 400 is positioned in a region relatively above the stabilizer bar 200 based on FIG. 1, FIG. 2, and FIG. 3.

Meanwhile, it should be noted that the PE module 400 of the present specification not only includes operating components, such as the motor, the speed reducer, and the inverter, that actually operate the vehicle provided with the structure 10, but also includes a housing configured to accommodate the operating components, and connection members configured to connect the housing and the fixing portion 300 and fixedly directly coupled to the fixing portion 300.

Meanwhile, the fixing portion 300 may be divided into a plurality of regions. With reference to FIG. 1, FIG. 2, and FIG. 3, according to the exemplary embodiment of the present disclosure, the fixing portion 300 may include PE module fixing members 310 each including one side fixedly coupled to the suspension frame 110 and configured to define a region to which the PE module 400 is fixed, and stabilizer bar fixing members 320 each including one side fixedly coupled to the suspension frame 110 and configured to define a region penetrated by the stabilizer bar 200. That is, according to the exemplary embodiment of the present disclosure, the PE module fixing member 310 and the stabilizer bar fixing member 320 may be fixedly coupled to the suspension frame 110. For example, the PE module fixing member 310 and the stabilizer bar fixing member 320 may be fastened to the suspension frame 110 by bolting. In the instant case, according to the exemplary embodiment of the present disclosure, the PE module fixing member 310 and the stabilizer bar fixing member 320 may be spaced apart from each other in a direction in which the suspension frame 110 extends. FIG. 1, FIG. 2, and FIG. 3 illustrate that in the exemplary embodiment of the present disclosure, the PE module fixing member 310 and the stabilizer bar fixing member 320 are fixedly coupled to a region of the suspension frame 110 that extends in a leftward/rightward direction, and the PE module fixing member 310 and the stabilizer bar fixing member 320 are spaced apart from each other in the leftward/rightward direction thereof.

In contrast, unlike the above-mentioned configuration, according to another exemplary embodiment of the present disclosure, the PE module fixing member 310 and the stabilizer bar fixing member 320 may be assembled to each other. With reference to FIG. 4, the fixing portion 300 may include the PE module fixing member 310 including one side fixedly coupled to the suspension frame 110 and configured to define the region to which the PE module 400 (see FIG. 1 and FIG. 2) is fixed, and the stabilizer bar fixing member 320 configured to define the region penetrated by the stabilizer bar 200. In the instant case, according to another exemplary embodiment of the present disclosure, the stabilizer bar fixing member 320 may be press-fitted into the PE module fixing member 310. Therefore, according to another exemplary embodiment of the present disclosure, the PE module fixing member 310 and the stabilizer bar fixing member 320 may be assembled and operate as a single component.

Meanwhile, according to another exemplary embodiment of the present disclosure, the PE module fixing member 310 may be fixedly coupled to the suspension frame 110, whereas the stabilizer bar fixing member 320 may not be fixedly coupled directly to the suspension frame 110. Instead, according to another exemplary embodiment of the present disclosure, the stabilizer bar fixing member 320 may be fixed relative to the suspension frame 110 as the PE module fixing member 310 and the suspension frame 110 are fixedly coupled.

However, according to another exemplary embodiment of the present disclosure, even though the stabilizer bar fixing member 320 is not fixedly coupled directly to the suspension frame 110, the stabilizer bar fixing member 320 may be tightly attached to the suspension frame 110. Therefore, as illustrated in FIG. 4, according to another exemplary embodiment of the present disclosure, because the stabilizer bar fixing member 320 is press-fitted into the PE module fixing member 310 and tightly attached to the suspension frame 110, the stabilizer bar fixing member 320 may be more stably fixed in the structure 10.

Furthermore, according to another exemplary embodiment of the present disclosure, the structure 10 according to an exemplary embodiment of the present disclosure may include penetration members 610 configured to penetrate the PE module fixing member 310 and coupled to the suspension frame 110. The penetration member 610 may be configured to fixedly couple the PE module fixing member 310 to the suspension frame 110. For example, the penetration member 610 may be a bolt.

Meanwhile, according to another exemplary embodiment of the present disclosure, the stabilizer bar 200 may be provided to be spaced apart from the suspension frame 110 in a region in which the stabilizer bar 200 is provided to penetrate the stabilizer bar fixing member 320. According to another exemplary embodiment of the present disclosure, the region of the stabilizer bar fixing member 320, which is penetrated by the stabilizer bar 200, may include a through-hole shape surrounded by a closed curve. Therefore, in the region in which the stabilizer bar 200 is provided to penetrate the stabilizer bar fixing member 320, an overall periphery of the stabilizer bar 200 may be surrounded by the stabilizer bar fixing member 320, and a partial region of the stabilizer bar fixing member 320 may be positioned between the stabilizer bar 200 and the suspension frame 110. Therefore, in the region in which the stabilizer bar 200 is provided to penetrate the stabilizer bar fixing member 320, the stabilizer bar 200 may be spaced apart from the suspension frame 110.

Meanwhile, as illustrated in FIG. 1 and FIG. 2, according to an exemplary embodiment of the present disclosure, the stabilizer bar 200 may be divided into a plurality of regions. The stabilizer bar 200 may include a first side stabilizer bar 210 provided to face a first side region R1 of the suspension frame 110, and a second side stabilizer bar 220 provided to face a second side region R2 of the suspension frame 110. For example, the first side region R1 of the suspension frame 110 may be one of the left and right regions of the suspension frame 110, and the second side region R2 of the suspension frame 110 may be the other of the left and right regions of the suspension frame 110. FIG. 1 and FIG. 2 illustrate that the first side region R1 is the left region, and the second side region R2 is the right region.

The first side stabilizer bar 210 and the second side stabilizer bar 220 may be provided separately. The first side stabilizer bar 210 and the second side stabilizer bar 220 may be provided to be attachable to or detachable from each other. In the instant case, in case that the stabilizer bar 200 needs to be detached from the inside of the structure 10 and maintained, only the stabilizer bar 200 may be detached without affecting the other components in the structure 10, which may improve the maintainability of the structure 10. The features of the stabilizer bar 200 and the surrounding components thereof for improving the maintainability of the structure 10 will be described below in detail.

According to an exemplary embodiment of the present disclosure, the stabilizer bar fixing members 320 may include a first side stabilizer bar fixing member 322 fixed relative to the suspension frame 110 and penetrated by the first side stabilizer bar 210, and a second side stabilizer bar fixing member 324 fixed relative to the suspension frame 110 and penetrated by the second side stabilizer bar 220. Furthermore, the PE module fixing members 310 may include a first side PE module fixing member 312 including one side fixed to the suspension frame 110 and penetrated by the first side stabilizer bar 210, and a second side PE module fixing member 314 including one side fixed to the suspension frame 110 and penetrated by the second side stabilizer bar 220. Meanwhile, in the present specification, the above-mentioned and following descriptions of the stabilizer bar fixing member 320 may be equally applied to the first side stabilizer bar fixing member 322 and the second side stabilizer bar fixing member 324. In the present specification, the above-mentioned and following descriptions of the PE module fixing member 310 may be equally applied to the first side PE module fixing member 312 and the second side PE module fixing member 314. The first side PE module fixing member 312, the second side PE module fixing member 314, the first side stabilizer bar fixing member 322, and the second side stabilizer bar fixing member 324 are exemplarily illustrated in FIG. 1, FIG. 2, and FIG. 3 illustrating the exemplary embodiment of the present disclosure. However, the descriptions of the first side PE module fixing member 312, the second side PE module fixing member 314, the first side stabilizer bar fixing member 322, and the second side stabilizer bar fixing member 324 may, of course, be equally applied to another exemplary embodiment of the present disclosure.

In the structure 10 according to an exemplary embodiment of the present disclosure, not only the stabilizer bar 200 but also the PE module 400 may be mounted and supported on the suspension frame 110. In the instant case, the structure 10 according to an exemplary embodiment of the present disclosure may include a structure in which stabilizer bar 200 and the PE module 400 share the space so that the space occupied by the stabilizer bar 200 and the PE module 400 may be minimized.

To achieve the above-mentioned object, according to an exemplary embodiment of the present disclosure, the stabilizer bar 200 may be provided to penetrate the fixing portion 300. As illustrated in FIG. 1, FIG. 2, FIG. 3, and FIG. 4, the stabilizer bar 200 is structured to not only penetrate the stabilizer bar fixing member 320 for fixing the stabilizer bar 200 but also penetrate the PE module fixing member 310 so that in the structure 10, a space occupied by the stabilizer bar fixing member 320 and the stabilizer bar 200 and a space occupied by the PE module fixing member 310 and the PE module 400 may at least partially overlap each other. Therefore, according to an exemplary embodiment of the present disclosure, the space occupied by the stabilizer bar 200 and the PE module 400 in the structure 10 may be minimized.

Meanwhile, according to an exemplary embodiment of the present disclosure, in the region in which the stabilizer bar 200 is provided to penetrate the stabilizer bar fixing member 320, the stabilizer bar fixing member 320 may be tightly attached to the stabilizer bar 200. This is to improve the performance in fixing the stabilizer bar 200 by allowing the stabilizer bar fixing member 320 to press the stabilizer bar 200. Meanwhile, the above-mentioned description may be equally applied to the first side stabilizer bar fixing member 322, the first side stabilizer bar 210, the second side stabilizer bar fixing member 324, and the second side stabilizer bar 220. That is, in the region in which the first side stabilizer bar 210 is provided to penetrate the first side stabilizer bar fixing member 322, the first side stabilizer bar fixing member 322 may be tightly attached to the first side stabilizer bar 210. In the region in which the second side stabilizer bar 220 is provided to penetrate the second side stabilizer bar fixing member 324, the second side stabilizer bar fixing member 324 may be tightly attached to the second side stabilizer bar 220. Furthermore, the above-mentioned description may be applied to both the case in which the stabilizer bar fixing member 320 is provided to be spaced apart from the PE module fixing member 310 (an exemplary embodiment of the present disclosure described above) and the case in which the stabilizer bar fixing member 320 is press-fitted into the PE module fixing member 310 (another exemplary embodiment of the present disclosure described above).

Figure 5:
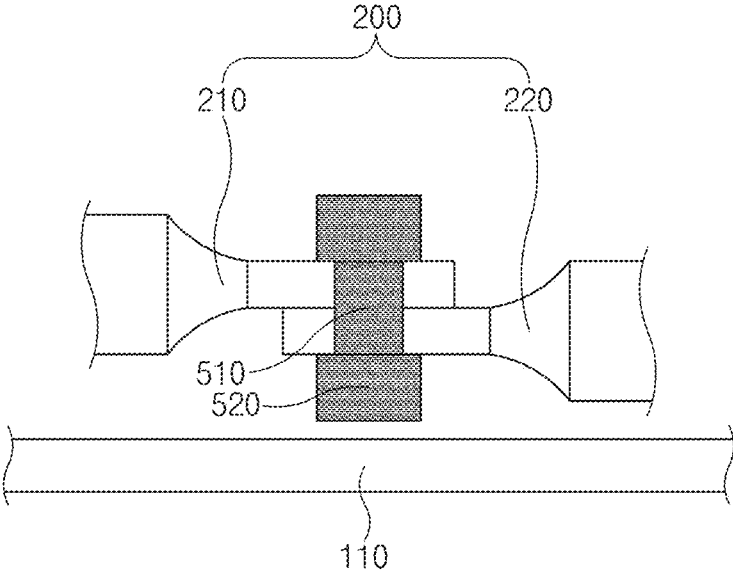
FIG. 5 is a view exemplarily illustrating an example in which a first side stabilizer bar and a second side stabilizer bar of a stabilizer bar provided in the structure of the present disclosure are coupled.
Figure 6:
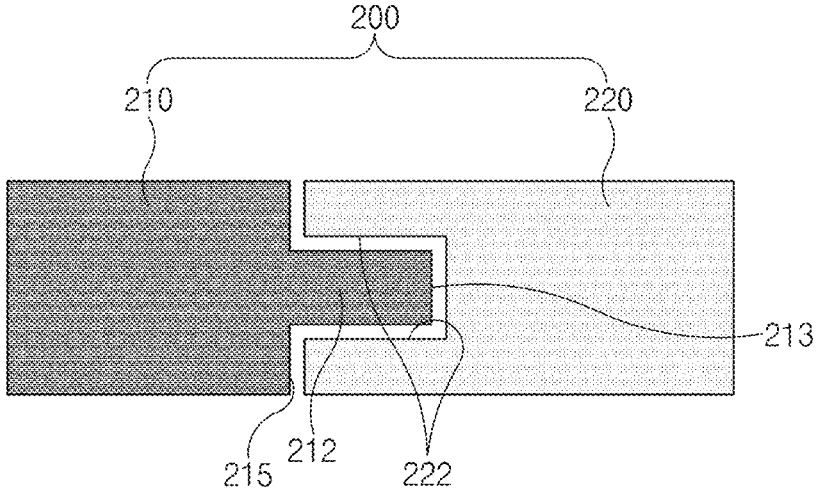
FIG. 6 is a view exemplarily illustrating another example in which the first side stabilizer bar and the second side stabilizer bar of the stabilizer bar provided in the structure of the present disclosure are coupled.
Figure 7:
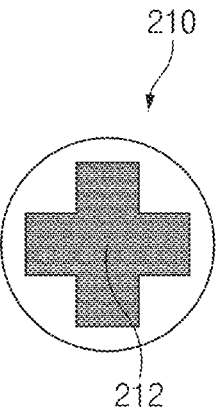
FIG. 7 is a view exemplarily illustrating an example of a shape of a first concave-convex region formed in the first side stabilizer bar in FIG. 6.

FIG. 5 is a view exemplarily illustrating an example in which the first side stabilizer bar and the second side stabilizer bar of the stabilizer bar provided in the structure of the present disclosure are coupled, and FIG. 6 is a view exemplarily illustrating another example in which the first side stabilizer bar and the second side stabilizer bar of the stabilizer bar provided in the structure of the present disclosure are coupled. FIG. 7 is a view exemplarily illustrating an example of a shape of a first concave-convex region formed in the first side stabilizer bar in FIG. 6.

Meanwhile, according to the example of the present disclosure, the first side stabilizer bar 210 and the second side stabilizer bar 220 may be coupled to each other by an intermediate configuration. As illustrated in FIG. 5, the structure 10 according to an exemplary embodiment of the present disclosure may further include a bolt member 510 configured to penetrate the first side stabilizer bar 210 and the second side stabilizer bar 220 in a region in which the first side stabilizer bar 210 and the second side stabilizer bar 220 overlap together, and a nut member 520 coupled to the bolt member 510. In the instant case, the stabilizer bar 200 may be detached from the structure 10 by separating the bolt member 510 and the nut member 520 from the first side stabilizer bar 210 and the second side stabilizer bar 220 and then separating the first side stabilizer bar 210 and the second side stabilizer bar 220 from the suspension frame 110. FIG. 5 illustrates an example in which the first side stabilizer bar 210 is provided to face the suspension frame 110 with the second side stabilizer bar 220 interposed therebetween in the region in which the bolt member 510 is provided to penetrate the first side stabilizer bar 210 and the second side stabilizer bar 220.

In contrast, unlike the above-mentioned configuration, according to another example, the first side stabilizer bar 210 and the second side stabilizer bar 220 may be coupled to each other by a geometric shape of the first side stabilizer bar 210 and a geometric shape of the second side stabilizer bar 220 without a separate intermediate configuration.

As illustrated in FIG. 6, in the region in which the first side stabilizer bar 210 and the second side stabilizer bar 220 overlap together, a first concave-convex region 212 may be formed on the first side stabilizer bar 210 and include a section 213 protruding toward the second side stabilizer bar 220, and a section 215 recessed in a direction away from the second side stabilizer bar 220, and a second concave-convex region 222 including a shape corresponding to the first concave-convex region 212 may be formed on the second side stabilizer bar 220. In the instant case, the first concave-convex region 212 and the second concave-convex region 222 may be coupled to each other while engaging with each other. According to another example described above, the first concave-convex region 212 and the second concave-convex region 222 do not include a configuration that relatively fixes the first concave-convex region 212 and the second concave-convex region 222. It may be understood that on the assumption that air resistance is ignored, the relative movement between the first concave-convex region 212 and the second concave-convex region 222, in the region in which the first concave-convex region 212 and the second concave-convex region 222 engage with each other, is restricted only by interference between the first concave-convex region 212 and the second concave-convex region 222 and a frictional force between the first concave-convex region 212 and the second concave-convex region 222.

In the instant case, the stabilizer bar 200 may be detached only by moving the first side stabilizer bar 210 and the second side stabilizer bar 220 in the directions in which the first concave-convex region 212 and the second concave-convex region 222 are away from each other so that the stabilizer bar 200 may be relatively easily detached.

Meanwhile, the first concave-convex region 212 and the second concave-convex region 222 may have various shapes. For example, as illustrated in FIG. 7, the first concave-convex region 212 may include a section 213 protruding in a cross shape, and the second concave-convex region 222 may include a section recessed in a cross shape and including a shape corresponding to the cross shape of the first concave-convex region 212.

As described above, according to an exemplary embodiment of the present disclosure, the stabilizer bar 200 is provided in the state in which the first side stabilizer bar 210 and the second side stabilizer bar 220 are coupled to or engage with each other to improve the maintainability of the structure 10 so that the first side stabilizer bar 210 and the second side stabilizer bar 220 may be attachable to or detachable from each other, and the process of detaching the stabilizer bar 200 may be easily performed.

In the instant case, to make it easier to perform the process of detaching the stabilizer bar 200, a direction (the leftward/rightward direction based on FIG. 2) in which the first side stabilizer bar 210 is provided to penetrate the first side stabilizer bar fixing member 322 may be parallel to a direction (the leftward/rightward direction based on FIG. 2) in which the first side stabilizer bar 210 faces the first concave-convex region 212, and a direction (the leftward/rightward direction based on FIG. 2) in which the second side stabilizer bar 220 is provided to penetrate the second side stabilizer bar fixing member 324 may be parallel to a direction (the leftward/rightward direction based on FIG. 2) in which the second side stabilizer bar 220 faces the second concave-convex region 222.

In the instant case, the stabilizer bar 200 may be detached from the structure 10 only by moving the first side stabilizer bar 210 in the direction (the leftward direction based on FIG. 2) from the second side toward the first side and moving the second side stabilizer bar 220 in the direction (the rightward direction based on FIG. 2) from the first side toward the second side so that the stabilizer bar 200 may be more easily detached. As illustrated in FIG. 1 and FIG. 2, a region of the first side stabilizer bar 210, which extends from the first side stabilizer bar fixing member 322 to the first concave-convex region 212, may include a straight shape, and a region of the second side stabilizer bar 220, which extends from the second side stabilizer bar fixing member 324 to the second concave-convex region 222, may also include a straight shape.

Meanwhile, as described above, the stabilizer bar 200 may penetrate the fixing portion 300. The stabilizer bar 200 may penetrate not only the stabilizer bar fixing member 320 but also the PE module fixing member 310.

The first side stabilizer bar 210 or the second side stabilizer bar 220 may penetrate the PE module fixing member 310. The present configuration may be applied to both the case in which the PE module fixing member 310 and the stabilizer bar fixing member 320 are spaced apart from each other, as in the exemplary embodiment of the present disclosure, and the case in which the stabilizer bar fixing member 320 is press-fitted into the PE module fixing member 310. The first side stabilizer bar 210 and the second side stabilizer bar 220 may penetrate the first side PE module fixing member 312 and the second side PE module fixing member 314, respectively.

Meanwhile, as described above, according to the exemplary embodiment of the present disclosure, the PE module fixing member 310 and the stabilizer bar fixing member 320 may be spaced apart from each other. In the instant case, in the region in which the first side stabilizer bar 210 or the second side stabilizer bar 220 is provided to penetrate the PE module fixing member 310, the first side stabilizer bar 210 or the second side stabilizer bar 220 may be substantially spaced apart from the PE module fixing member 310. That is, in the region in which the first side stabilizer bar 210 is provided to penetrate the first side PE module fixing member 312, the first side stabilizer bar 210 may be substantially spaced apart from the first side PE module fixing member 312. In the region in which the second side stabilizer bar 220 is provided to penetrate the second side PE module fixing member 314, the second side stabilizer bar 220 may be substantially spaced apart from the second side PE module fixing member 314. In the instant case, the configuration in which the first side stabilizer bar 210 or the second side stabilizer bar 220 is 'substantially' spaced apart from the PE module fixing member 310 may mean that the first side stabilizer bar 210 or the second side stabilizer bar 220 is spaced apart from the PE module fixing member 310 in most cases temporally or physically even though the first side stabilizer bar 210 or the second side stabilizer bar 220 may be temporarily or partially brought into contact with the PE module fixing member 310 by an external force, vibration, or the like. It may be understood that in the region in which the first side stabilizer bar 210 or the second side stabilizer bar 220 is provided to penetrate the PE module fixing member 310, a size of a through-hole of the PE module fixing member 310 is greater than a size of a cross-section of the first side stabilizer bar 210 or the second side stabilizer bar 220.

Meanwhile, with reference to FIG. 1 and FIG. 2, the fixing portion 300 may include a first side fixing portion 300*a* penetrated by the first side stabilizer bar 210, and a second side fixing portion 300*b* penetrated by the second side stabilizer bar 220. The first side fixing portion 300*a* may include the first side PE module fixing member 312 and the first side stabilizer bar fixing member 322, and the second side fixing portion 300*b* may include the second side PE module fixing member 314 and the second side stabilizer bar fixing member 324.

Vehicle

A vehicle according to an exemplary embodiment of the present disclosure may include the structure 10 described above. For example, the structure 10 may be connected to a front wheel of the vehicle. The description of the structure 10 provided in the vehicle according to an exemplary embodiment of the present disclosure may be replaced with the above-mentioned description of the structure 10 according to an exemplary embodiment of the present disclosure.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A structure comprising:
a suspension module including a suspension frame; and
a stabilizer bar provided to face one side of the suspension frame,
wherein the stabilizer bar includes:
a first side stabilizer bar provided to face a first side region of the suspension frame; and
a second side stabilizer bar provided to face a second side region of the suspension frame, and
wherein the first side stabilizer bar and the second side stabilizer bar are provided to be attachable to or detachable from each other,
wherein the structure further including:
a fixing portion including one side fixedly coupled to the suspension frame and configured to fix the stabilizer bar relative to the suspension frame; and
a power electronics (PE) module fixedly coupled to one side of the fixing portion,
wherein the fixing portion further includes a PE module fixing member including one side fixedly coupled to the suspension frame and configured to define a region to which the PE module is fixed, and
wherein the first side stabilizer bar or the second side stabilizer bar is provided to penetrate the PE module fixing member.

2. The structure of claim 1, further including:
a bolt member configured to penetrate the first side stabilizer bar and the second side stabilizer bar in a region in which the first side stabilizer bar and the second side stabilizer bar overlap together; and
a nut member coupled to the bolt member.

3. The structure of claim 2, wherein the first side stabilizer bar is provided to face the suspension frame with the second side stabilizer bar interposed therebetween in the region in which the bolt member is provided to penetrate the first side stabilizer bar and the second side stabilizer bar.

4. The structure of claim 1,
wherein in a region in which the first side stabilizer bar and the second side stabilizer bar overlap together, a first concave-convex region is formed on the first side stabilizer bar and includes a first section protruding toward the second side stabilizer bar, and a second section recessed in a direction away from the second side stabilizer bar, and a second concave-convex region including a shape corresponding to the first concave-convex region is formed on the second side stabilizer bar, and wherein the first concave-convex region and the second concave-convex region are coupled while engaging with each other.

5. The structure of claim 4, wherein no configuration is provided to relatively fix the first concave-convex region and the second concave-convex region.

6. The structure of claim 4, wherein a relative movement between the first concave-convex region and the second concave-convex region, in a region in which the first concave-convex region and the second concave-convex region engage with each other, is restricted only by interference between the first concave-convex region and the second concave-convex region and a frictional force between the first concave-convex region and the second concave-convex region.

7. The structure of claim 4, wherein the first concave-convex region includes the first section protruding in a cross shape, and wherein the second concave-convex region includes a section recessed in a cross shape and including a shape corresponding to the cross shape of the first concave-convex region.

8. The structure of claim 4, wherein the fixing portion includes a stabilizer bar fixing member including one side fixedly coupled to the suspension frame and configured to define a region penetrated by the stabilizer bar, wherein the stabilizer bar fixing member includes a first side stabilizer bar fixing member fixed relative to the suspension frame and penetrated by the first side stabilizer bar, and wherein a direction in which the first side stabilizer bar is provided to penetrate the first side stabilizer bar fixing member is parallel to a direction in which the first side stabilizer bar faces the first concave-convex region.

9. The structure of claim 4, wherein the fixing portion includes a stabilizer bar fixing member including one side fixedly coupled to the suspension frame and configured to define a region penetrated by the stabilizer bar, wherein the stabilizer bar fixing member includes a first side stabilizer bar fixing member fixed relative to the suspension frame and penetrated by the first side stabilizer bar, and wherein a region of the first side stabilizer bar, which extends from the first side stabilizer bar fixing member to the first concave-convex region, includes a straight shape.

10. The structure of claim 1, wherein the fixing portion further includes:

a stabilizer bar fixing member including one side fixedly coupled to the suspension frame and configured to define a region penetrated by the stabilizer bar, and wherein the PE module fixing member and the stabilizer bar fixing member are spaced apart from each other in a direction in which the suspension frame extends.

11. The structure of claim 10, wherein the stabilizer bar fixing member includes:

a first side stabilizer bar fixing member fixed relative to the suspension frame and penetrated by the first side stabilizer bar; and a second side stabilizer bar fixing member fixed relative to the suspension frame and penetrated by the second side stabilizer bar.

12. The structure of claim 10, wherein the stabilizer bar fixing member is attached to the stabilizer bar in the region in which the stabilizer bar is provided to penetrate the stabilizer bar fixing member.

13. The structure of claim 1, wherein the fixing portion includes:

a PE module fixing member including one side fixedly coupled to the suspension frame and configured to define a region to which the PE module is fixed; and a stabilizer bar fixing member configured to define a region penetrated by the stabilizer bar, and wherein the stabilizer bar fixing member is press-fitted into the PE module fixing member.

14. The structure of claim 13, wherein the region of the stabilizer bar fixing member, which is penetrated by the stabilizer bar, includes a through-hole shape surrounded by a closed curve.

15. The structure of claim 13, wherein the stabilizer bar fixing member is fixed relative to the suspension frame as the PE module fixing member and the suspension frame are fixedly coupled.

16. The structure of claim 15, wherein the stabilizer bar fixing member is attached to the suspension frame.

17. The structure of claim 1, wherein the first side stabilizer bar or the second side stabilizer bar is substantially spaced apart from the PE module fixing member in a region in which the first side stabilizer bar or the second side stabilizer bar is provided to penetrate the PE module fixing member.

18. A vehicle including the structure of claim 1, wherein one side of the structure is connected to a front wheel of the vehicle.

* * * * *